(12) United States Patent
Rall

(10) Patent No.: US 6,410,998 B1
(45) Date of Patent: Jun. 25, 2002

(54) CIRCUIT ARRANGEMENT WITH A REDUCTION CIRCUIT FOR REDUCING INTERFERING LONGITUDINAL VOLTAGES ON A TWO-WIRE LINE

(75) Inventor: Bernhard Rall, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/543,043

(22) Filed: Apr. 5, 2000

(30) Foreign Application Priority Data

Apr. 23, 1999 (DE) .......................... 199 18 512

(51) Int. Cl.⁷ ................................ H04B 3/30
(52) U.S. Cl. ....................... 307/130; 307/125
(58) Field of Search .................. 307/9.1, 10.1, 307/130, 125

(56) References Cited

U.S. PATENT DOCUMENTS

| | | | |
|---|---|---|---|
| 5,499,336 A | * | 3/1996 | Preis et al. ............ 395/182.02 |
| 5,892,893 A | * | 4/1999 | Hanf et al. ............ 395/182.01 |
| 6,115,831 A | * | 9/2000 | Hanf et al. ............ 714/43 |

FOREIGN PATENT DOCUMENTS

| | | | | |
|---|---|---|---|---|
| DE | 3237919 A1 | * | 4/1984 | ............ H04B/3/30 |
| DE | 37 44 130 A1 | | 12/1987 | |
| DE | 3744130 A1 | * | 7/1989 | ............ H04M/3/30 |
| EP | 0419935 A2 | * | 4/1991 | ......... H04M/19/00 |
| EP | 1047205 A2 | * | 10/2000 | ............ H04B/3/32 |

OTHER PUBLICATIONS

Article by Jens–Ulf Pehrs and Hans–Christian Reuss entitled "CAN–das sichere Buskonzept" dated 1991.

* cited by examiner

Primary Examiner—Fritz Fleming
(74) Attorney, Agent, or Firm—Crowell & Moring LLP

(57) ABSTRACT

A circuit arrangement for reducing interfering longitudinal voltages on a two-wire line includes a reduction circuit for reducing the interfering longitudinal voltages, a detector coupled to the two-wire line that generates a switch-off signal in the absence of a push-pull signal on at least one of the cores in the two-wire line and a switch circuit that switches off the reduction circuit in response to the switch-off signal.

8 Claims, 1 Drawing Sheet

CIRCUIT ARRANGEMENT WITH A REDUCTION CIRCUIT FOR REDUCING INTERFERING LONGITUDINAL VOLTAGES ON A TWO-WIRE LINE

The invention relates to a circuit arrangement with a reduction circuit for reducing interfering longitudinal voltages on a two-wire line, to which balanced push-pull signals can be applied.

BACKGROUND

In two-wire line systems, the signal voltage is defined as the difference between the voltages in the two cores relative to a reference-earth potential, such as earth. The longitudinal voltage of the two-wire line is understood to be the arithmetic mean of the two voltages. In the case of an ideal push-pull signal, the two voltages are completely balanced except for a constant, with the result that the longitudinal voltage vanishes or is constant over time. In the case of transmission systems which feed the two-wire line without balance-to-unbalance transformers, however, it is not possible to comply precisely with the requirement of temporal constancy of the longitudinal voltage at the switch-over moments and during a switching state. Overlap faults and fault pulses lead to system-dictated longitudinal interference voltages whose magnitude depends on the drive electronics used and the line network impedance. These longitudinal interference voltages can have such an interfering effect on capacitive vehicle antennas that expensive network screening measures or compensation of the longitudinal interference voltages become necessary.

DE 37 44 130 A1 discloses a circuit arrangement of the type mentioned in the introduction in which a reduction circuit for reducing interfering longitudinal voltages is looped into a two-wire line. The reduction circuit comprises a first and a second voltage divider each connected to the two cores of the two-wire line. The centre tap of the first voltage divider is connected to the inverting input of a differential amplifier, while the centre tap of the second voltage divider is connected to the output of the differential amplifier. The non-inverting input of the differential amplifier is at the balance potential, e.g. earth, of the two-wire line. By virtue of this circuitry, a negative feedback is obtained, that is to say the differential amplifier generates, in the two cores, a potential difference which is always opposed to the interfering longitudinal voltage.

In many two-wire line systems to which balanced push-pull signals are applied, such as e.g. in CAN bus systems of motor vehicles, an emergency running mode is provided for the case of a line fault, in which mode the message transmission is effected via just one core and is thus completely unbalanced with respect to earth. The signal voltage degenerates in this case into a very large longitudinal voltage whose amplitude, in the case of a CAN bus system, is e.g. 4 V instead of the 20 mV to 150 mV occurring in the two-wire mode. If the abovementioned circuit arrangement is used in such a transmission system for the purpose of suppressing the interfering longitudinal voltages, then although it effectively suppresses the interfering longitudinal voltages in the two-wire mode, in the single-wire mode it will attempt to suppress the emergency-running useful signal, since the latter has degenerated into a longitudinal voltage.

The article "CAN—das sichere Buskonzept" [CAN —the reliable bus concept] which appeared in the technical journal Elektronik 17/1991 describes such a fault-tolerant CAN bus on pages 96–101. In particular in the section "MaBnahmen zur Behandlung globaler und lokaler Busfehler" [Measures for the treatment of global and local bus faults] and the subsequent sections, a description is given of how the CAN driver module detects a fault and of the fact that it is possible to switch over to single-wire operation in the event of particular faults. In order to detect all possible single faults, a program which identifies the setting and functional testing of all possible transmission modes is used as detector means. Interfering longitudinal voltages are not made a central theme in this citation.

The object of the invention is to specify a circuit arrangement of the generic type which, in addition to the two-wire mode with the capability of reducing interfering longitudinal voltages, also enables a single-wire mode of the two-wire line.

SUMMARY OF THE INVENTION

According to the invention, a circuit arrangement contains, in addition to a reduction circuit known per se, detector means connected to the two-wire line, which generate a switch-off signal in the absence of one of the two push-pull signals. Moreover, switching means connected to the detector means and to the reduction circuit are provided, which switch of f the reduction circuit when the switch-off signal is present.

Preferably, in the detector means also generate a switch-off signal when the interfering longitudinal voltages exceed a predeterminable threshold value. This prevents the reduction circuit from being overdriven, and the data signals from being unnecessarily distorted, in the event of high interfering longitudinal voltages.

This circuit arrangement can be realized in a particularly simple manner if, the detector means are designed as a CAN driver. Such conventional CAN drivers are already present as completed units and are used in CAN bus systems for detecting specific classes of transmission faults and, if appropriate, for initiating the switch-over to the single-wire mode. Either the CAN driver is additionally introduced into the system, or the switch-off signal is fed to the switching means by a CAN driver that is provided in any case.

An advantageous refinement of the invention allows interfering longitudinal voltages to be effectively suppressed even when the push-pull signals are only approximately balanced. This is achieved by virtue of the fact that, in the case of the reduction circuit described in the introduction, the non-inverting input of a differential amplifier has applied to it a low-pass-filtered summation signal as reference signal rather than a predetermined balance potential, for instance earth. Although this dispenses with the reduction of low-frequency components of the interfering longitudinal voltage, the reduction of the high-frequency components, which have a particularly adverse effect on message transmission, is considerably improved by this measure.

BRIEF DESCRIPTION OF THE DRAWINGS

Advantageous exemplary embodiments of the invention are illustrated in the drawings and are described below. In the figures.

DETAILED DESCRIPTION

Figure 1:
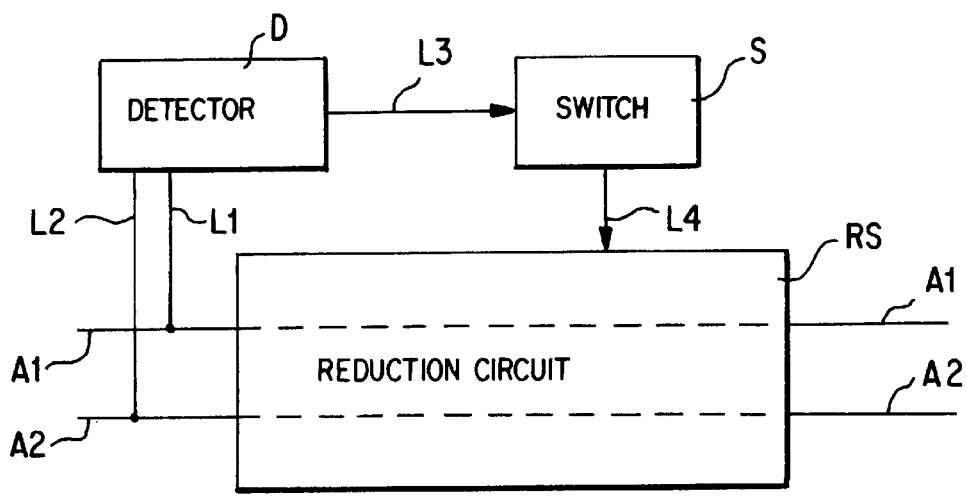
FIG. 1 shows a block diagram of a circuit arrangement according to the invention.

FIG. 1 shows a two-wire line having two cores A1 and A2, via which messages are transmitted in the form of balanced push-pull signals, that is to say the voltages applied to the cores ideally have identical magnitudes but different signs. A reduction circuit RS is looped into the two-wire line. A detector D is connected to the cores A1 and A2 via lines L1 and L2, respectively, which detector has the task of detecting the absence of a push-pull signal in precisely one of the cores A1 or A2. If this is the case, then it is certain that one core has a line fault and the message transmission is effected via the other core in the single-wire emergency running mode. Absence of a push-pull signal in this sense can also be assumed when the average signal amplitude falls below a predeterminable threshold value in a core. The switch-over from the two-wire to the single-wire mode is effected by drivers or switches (not illustrated in FIG. 1) if a transmission fault of a specific fault class has occurred, such as e.g. a line interruption or a short circuit with respect to earth or with respect to the voltage supply or with respect to the other core.

Preferably, the detector means also generate a switch-off signal when the interfering longitudinal voltages exceed a predeterminable threshold value. This prevents the reduction circuit from being overdriven, and the data signals from being unnecessarily distorted, in the event of high interfering longitudinal voltages.

Principally if the circuit arrangement is part of a CAN bus system, the detector D may advantageously be designed as a CAN driver equipped with a fault detection device. Such CAN drivers are known to the person skilled in the art and are not, therefore, explained in any further detail here. If the detector D ascertains that the push-pull signal is absent on one of the two cores A1 or A2, then it generates a corresponding switch-off signal which is fed via a line L3 to a switch S. When this switch-off signal is present, the switch S switches off the reduction circuit RS via a line L4. This can be done for instance by the reduction circuit being disconnected from an operating voltage source required for its operation. Reduction of interfering longitudinal voltages does not take place in the switched-off state; moreover, in the switched-off state, the reduction circuit is intended to be transparent to the signals transmitted in the single-wire mode, so that the single-wire mode is not interfered with by the reduction circuit.

Figure 2:
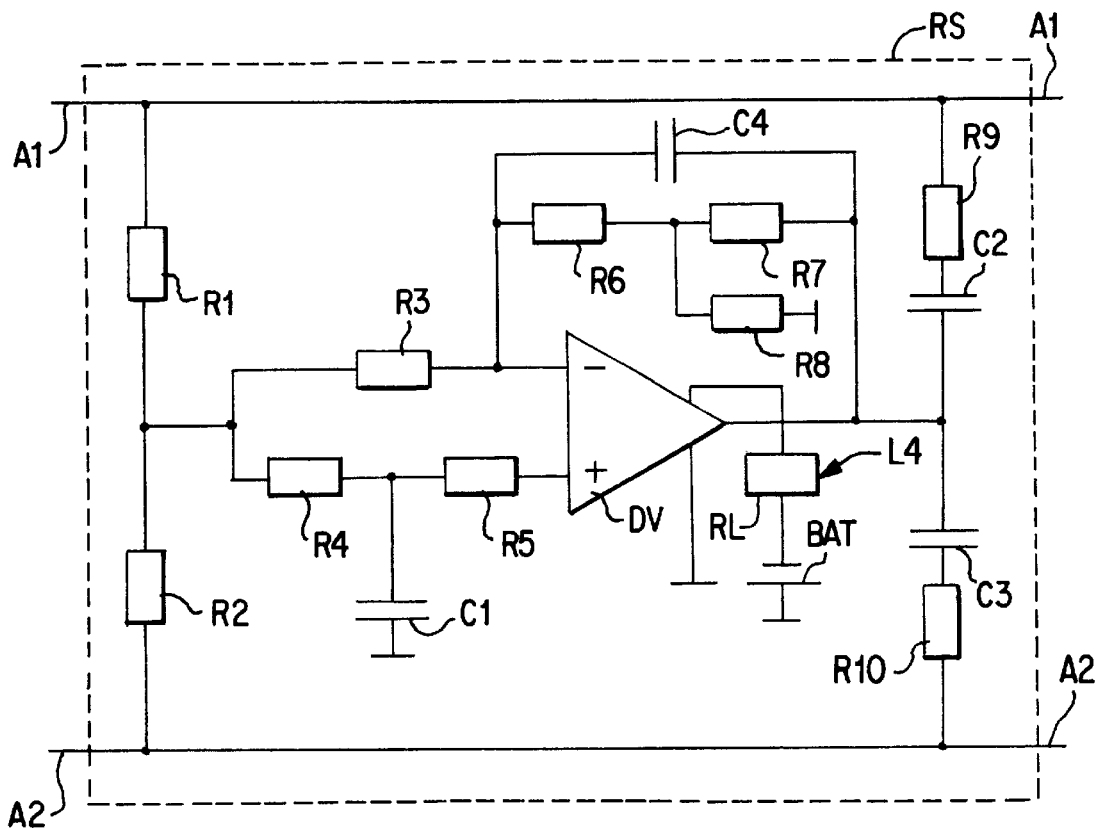
FIG. 2 shows an improved reduction circuit for use in a circuit arrangement according to FIG. 1.

FIG. 2 shows an improved reduction circuit RS which can advantageously be used in the circuit arrangement of FIG. 1 as an alternative to a conventional reduction circuit. A balanced voltage divider is formed by resistors R1 and R2 between the cores A1 and A2. The centre tap of this voltage divider is fed to the inverting input of a differential amplifier DV directly or via a resistor R3. In parallel therewith, the centre tap of the voltage divider is connected to the non-inverting input of the differential amplifier DV via a low-pass filter, which comprises a resistor R4 and a capacitor C1, and also a further resistor R5. Thus, in contrast to the known reduction circuit, the reference voltage applied to the non-inverting input is not a fixedly predetermined balance potential, e.g. earth, but rather is determined from the sum of the push-pull signals by low-pass filtering. This is tantamount to dispensing with the reduction of low-frequency components of the interfering longitudinal voltage; however, the reduction of the high-frequency components, which have a particularly adverse effect on the message transmission, is considerably improved by this measure.

The output of the differential amplifier DV is connected to the cores A1 and A2 via identical series circuits formed by capacitors and resistors C2 and $R_9$, and respectively C3 and $R_{10}$. Instead of these series circuits, it is also possible to use other switching groups in order to match the reduction circuit RS to the properties of the two-wire line used in each case. The functional principle of the improved reduction circuit RS corresponds to that of the known reduction circuit cited in the introduction, apart from the definition of the reference voltage at the non-inverting input. In this case, too, voltages which lead to a reduction of interfering longitudinal voltages are thus applied to the cores A1 and A2 of the two-wire line according to the principle of negative feedback.

In order to stabilize the operating point, high-value resistors R6 and R7 are connected between the inverting input of the differential amplifier DV and the output thereof. A capacitor C4 may additionally be provided in parallel therewith, which capacitor suppresses high-frequency oscillations. A further resistor R8 shifts the operating point of the differential amplifier output to the desired voltage value.

In order to turn off the reduction circuit RS, the switch S from FIG. 1 can, for example, disconnect the differential amplifier DV from a voltage supply BAT assigned to it via a relay or a transistor circuit RL.

The 5 V operating voltage of the CAN drivers and the 5 V signal level of the CAN signals render the operation of a fast control amplifier more difficult, a signal swing of just 2 V to 3 V thus remaining for the said amplifier. The use of a battery voltage of 13.7 V permits a signal swing of more than 10 V, with the advantage of higher speed and less network loading by high-value resistors $R_9$ and $R_{10}$.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A circuit arrangement for reducing interfering longitudinal voltages on a two-wire line to which balanced push-pull signals can be applied, the circuit arrangement comprising:

a reduction circuit for reducing the longitudinal voltages;

detector means coupled to the two-wire line for generating a switch-off signal in the absence of a push-pull signal on at least one of the cores of the two-wire line; and switching means coupled to the detector means and to the reduction circuit for switching the reduction circuit off in response to the switch-off signal.

2. A circuit arrangement according to claim 1 wherein the detector means also generates a switch-off signal when the interfering longitudinal voltage on at least one of the cores of the two-wire line exceeds a predetermined threshold value.

3. A circuit arrangement according to claim 1 wherein the circuit arrangement is used in a CAN bus system and the detector means includes a CAN driver with fault detection.

4. A circuit arrangement according to claim 1 wherein the reduction circuit comprises a voltage divider looped between cores of the two-wire line, and a differential amplifier having an inverting input coupled to a center tap of the voltage divider and a non-inverting input connected to the center tap of the voltage divider through a low-pass filter, the differential amplifier having an output coupled to the cores of the two-wire line.

5. The circuit arrangement according to claim 4 wherein the output of the differential amplifier is coupled to each of the cores of the two-wire line through series circuits comprising at least one capacitor connected in series with at least one resistor.

6. The circuit arrangement according to claim 4 wherein a capacitor is coupled between the non-inverting input of the differential amplifier and the output of the differential amplifier.

7. The circuit arrangement according to claim 4 wherein at least one resistor is connected between the non-inverting input of the differential amplifier and the output of the differential amplifier.

8. The circuit arrangement according to claim 6 wherein the circuit arrangement is used in a vehicle having a battery, the battery coupled to the differential amplifier to power the differential amplifier with substantially the entire battery voltage, the differential amplifier configured so that a DC operating point of the differential amplifier is at the mid-range of the battery voltage.

* * * * *